(12) United States Patent
Lee

(10) Patent No.: US 10,095,086 B2
(45) Date of Patent: Oct. 9, 2018

(54) CAMERA MODULE

(71) Applicant: LG ELECTRONICS INC., Seoul (KR)

(72) Inventor: Changhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 15/103,918

(22) PCT Filed: Dec. 23, 2013

(86) PCT No.: PCT/KR2013/012038
§ 371 (c)(1),
(2) Date: Jun. 13, 2016

(87) PCT Pub. No.: WO2015/099209
PCT Pub. Date: Jul. 2, 2015

(65) Prior Publication Data
US 2016/0313629 A1   Oct. 27, 2016

(51) Int. Cl.
*G03B 11/00* (2006.01)
*G03B 17/12* (2006.01)
(Continued)

(52) U.S. Cl.
CPC .............. *G03B 11/00* (2013.01); *G02B 5/208* (2013.01); *G02B 9/34* (2013.01); *G02B 13/004* (2013.01);
(Continued)

(58) Field of Classification Search
CPC ........ G03B 11/00; G03B 17/12; G02B 5/208; G02B 5/281; G02B 9/34; G02B 13/004;
(Continued)

(56) References Cited

U.S. PATENT DOCUMENTS

2002/0036779 A1     3/2002  Kiyoi et al.
2004/0212719 A1 *  10/2004  Ikeda .................. H04N 5/2254
                                                              348/340
(Continued)

FOREIGN PATENT DOCUMENTS

JP     2001-280916 A    10/2001
JP     2005-17347 A     1/2005
(Continued)

*Primary Examiner* — Michael Teitelbaum
(74) *Attorney, Agent, or Firm* — Birch, Stewart, Kolasch & Birch, LLP

(57) ABSTRACT

Provided in the present invention is a camera module comprising: an imaging lens on which incident light from an external environment is reflected; and an image sensor for obtaining image data related to the external environment by means of the light, and further comprising a filter portion, which is arranged on the image sensor to cut light having a predetermined wavelength, is sectioned into a center zone in which the incidence angle of the light is a first incidence angle, and a peripheral zone surrounding the center zone in which the incidence angle of the light is a second incidence angle that is bigger than the first incidence angle, wherein the filter portion having the center zone and the peripheral zone is formed so that light having wavelengths that differ from the incident light having the first and second incidence angle is cut.

7 Claims, 4 Drawing Sheets

(51) Int. Cl.
| | |
|---|---|
| *G02B 13/00* | (2006.01) |
| *G02B 5/20* | (2006.01) |
| *G02B 9/34* | (2006.01) |
| *H04N 5/225* | (2006.01) |
| *H04N 5/33* | (2006.01) |
| *G02B 5/28* | (2006.01) |

(52) U.S. Cl.
CPC ........... *G03B 17/12* (2013.01); *H04N 5/2253* (2013.01); *H04N 5/2254* (2013.01); *H04N 5/2257* (2013.01); *H04N 5/332* (2013.01); *G02B 5/281* (2013.01)

(58) Field of Classification Search
CPC .. H04N 5/2253; H04N 5/2254; H04N 5/2257; H04N 5/332
See application file for complete search history.

(56) References Cited

U.S. PATENT DOCUMENTS

| | | | |
|---|---|---|---|
| 2007/0098400 A1 | 5/2007 | Chen | |
| 2007/0278406 A1* | 12/2007 | Haug | B60R 1/00 250/338.1 |
| 2012/0008023 A1* | 1/2012 | Wajs | H04N 1/409 348/273 |

FOREIGN PATENT DOCUMENTS

| | | |
|---|---|---|
| JP | 2012-2870 A | 1/2012 |
| JP | 2012-247645 A | 12/2012 |

\* cited by examiner (a)

(b)

(a)

(b)

CAMERA MODULE

CROSS REFERENCE TO RELATED APPLICATIONS

This application is the National Phase of PCT International Application No. PCT/KR2013/012038, filed on Dec. 23, 2013, which is hereby expressly incorporated by reference into the present application.

TECHNICAL FIELD

The present disclosure relates to a camera module with a filter.

BACKGROUND ART

A camera module is equipped in various electronic devices such as TVs, mobile terminals, vehicles, home appliances, and the like. A wavelength of light used by the camera module may differ according to a characteristic of each electronic device. For example, a camera module for acquiring an image using visible rays uses an infrared (IR) cut filter, and an IR camera for acquiring an image using infrared rays uses an IR band pass filter for cutting light with different wavelengths except for the infrared rays.

The related art camera lens uses a method of merging color images by blocking non-imaging optical noise using an IR cut filter that is a flat device disposed between an imaging lens and an image sensor for cutting IR rays.

The device for cutting the IR rays is typically disposed between the imaging lens and the image sensor, but alternatively configured in a manner of being coated on a surface of a lens without using the IR cut filter, in a manner of arranging the IR cut filter on an IRIS of a lens center portion. Also, the device for cutting the IR rays is also configured in a form of a cover glass on an outer side of a camera so as to block (cut) the IR rays. For CCTV, an IR filter employing a day & night switching method, so-called a day & night meter, is used between the imaging lens and the image sensor.

The IR cut filter cuts IR rays in a reflection-coating manner. However, the scattered reflection of the cut IR rays is introduced into the image sensor and often serves as noise light. Accordingly, for a high-resolution camera and a high-end camera which attaches great attention to performance, an absorption filter that absorbs IR rays by a material characteristic is sometimes used, instead of the reflection-type IR cut filter.

In proportion to an incidence angle of light that is incident on a lens, an exit angle (CRA) of light passed through the lens increases. According to this principle, if a size of the lens itself is reduced, the exit angle (CRA) of light which passes the closest area to an edge of the lens increases.

Meanwhile, a transmission characteristic of a filter differs according to an incidence angle (substantially the same as CRA) of light reaching a filter. Therefore, a wavelength shift is caused at a peripheral (or surrounding) area of the filter at which light arrives at a great incidence angle, which results in failing to cut IR rays to be blocked or cutting IR rays to be transmitted. This causes optical noise.

DISCLOSURE OF THE INVENTION

Therefore, to obviate those problems, an aspect of the detailed description is to provide a camera module, capable of reducing optical noise by matching transmission characteristics according to different incidence angles.

To achieve these and other advantages and in accordance with the purpose of the present invention, as embodied and broadly described herein, there is provided a camera module, including an imaging lens on which incident light from an external environment is reflected, an image sensor for obtaining image data related to the external environment by means of the light, and a filter portion arranged on the image sensor to cut light having a preset wavelength, and sectioned into a center zone on which light is incident at a first incidence angle, and a peripheral zone which surrounds the center zone and on which light is incident at a second incidence angle that is greater than the first incidence angle, wherein the filter portion having the center zone and the peripheral zone is configured to cut light having different wavelengths, among the incident light having the first and second incidence angles.

In one embodiment related to the present invention, the filter portion may be formed of a coating material cutting light with wavelengths except for infrared light, among the incident light.

In one embodiment related to the present invention, the filter portion may be formed of a coating material preventing a transmission of infrared light among the incident light.

In one embodiment related to the present invention, the filter portion may include a base member disposed between the image sensor and the imaging lens and configured to receive light from the imaging lens, a first filter member formed on the center zone of the base member, and cutting light with a preset wavelength when light is incident at the first incidence angle, and a second filter member formed on the peripheral zone of the base member, and cutting light with the preset wavelength when light is incident at the second incidence angle.

In one embodiment related to the present invention, the filter portion may include a base member disposed between the image sensor and the imaging lens and configured to receive light from the imaging lens, a second filter member formed fully on one surface of the base member and cutting light with the preset wavelength when light is incident at the second incidence angle, and a third filter member formed on the center zone of another surface of the base member, and cutting light with the preset wavelength along with the second filter member.

In one embodiment related to the present invention, the filter portion may be provided with a plurality of filter members of the camera module, and each of the plurality of filter members may be arranged in an overlapping manner on one area thereof, so as to cut light with a preset wavelength, among the incident light having the first and second incidence angles.

In one embodiment related to the present invention, at least one of the plurality of filter members may be formed on at least one surface of the imaging lens.

In one embodiment related to the present invention, at least one of the plurality of filter members may be formed on one surface of the image sensor.

In one embodiment related to the present invention, the camera module may further include a cover glass configuring a part of an outer surface of the camera module and made of a transparent material for allowing an introduction of light, and at least one of the plurality of filter members may be formed on one surface of the cover glass.

In one embodiment related to the present invention, the center zone may include an area on which light transmitted through the imaging lens is incident at an angle of 0°.

Advantageous Effect

In accordance with the detailed description, a filter portion can be configured as filter members having different transmission characteristics according to incidence angles such that light with a preset wavelength can be transmitted. This may result in minimizing optical noise introduced into an image sensor, thereby improving image quality.

Also, since an incidence angle of light introduced into the image sensor can increase, the degree of freedom of designing a lens can increase, thereby reducing an entire size of a camera.

MODES FOR CARRYING OUT THE PREFERRED EMBODIMENTS

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Figure 1A:
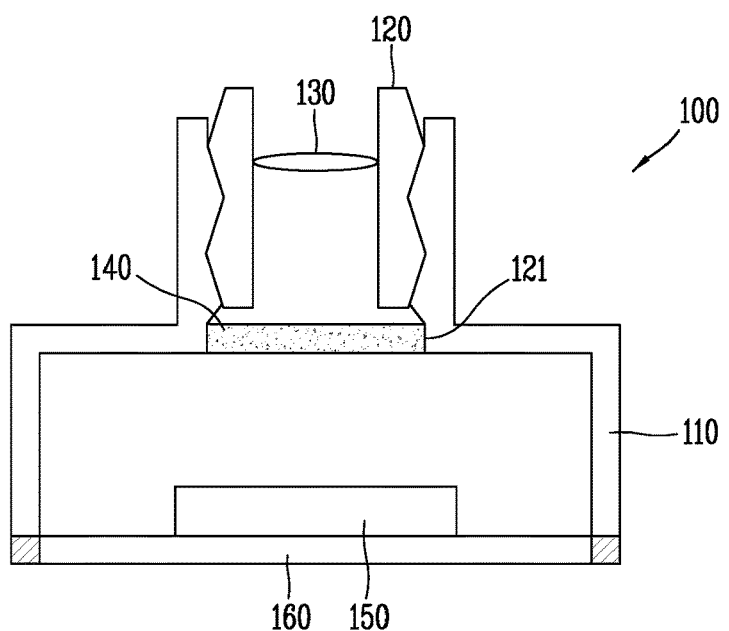
FIG. 1A is a sectional view of a camera module in accordance with one embodiment of the present invention.

FIG. 1A is a sectional view of a camera module in accordance with one embodiment of the present invention. The camera module 100 includes a holder 110, a barrel 120, an imaging lens 130, a filter portion 140, an image sensor 150, and a printed circuit board (PCB) 160.

The holder 110 with an opening 121 for exposing the image sensor 150 is attached onto an upper surface of the PCB 160. A connector (not illustrated) for transferring an optical signal generated by the image sensor 150 to a main board is connected to the PCB 160. A conductive material may be coated on a surface of the holder 110 such that the surface of the holder 110 is maintained in a conductive state. For example, to smoothly maintain the conductive state of the surface of the holder 110, the surface of the holder 110 preferably has resistance less than 1 ohm ($\Omega$). That is, the holder 110 may be coated with conductive paints with low resistance.

The holder 110 perpendicularly extends up near an edge of the opening 121, and the barrel 120 for fixing the imaging lens 130 is mounted on an inner wall of the extended portion of the holder 110. The barrel 120, as illustrated, may be formed in a shape of a screw but the present invention may not be limited to this.

The image sensor 150 converts received light by an electric signal, and outputs an image through an electronic component and the like.

The filter portion 140 that cuts light with a preset wavelength, which is incident from outside, may be provided in the opening 121. As illustrated, the filter portion 140 may be formed in a shape of an integral film and provided in a fixed manner, but the present invention may not be limited to this.

Figure 1B:
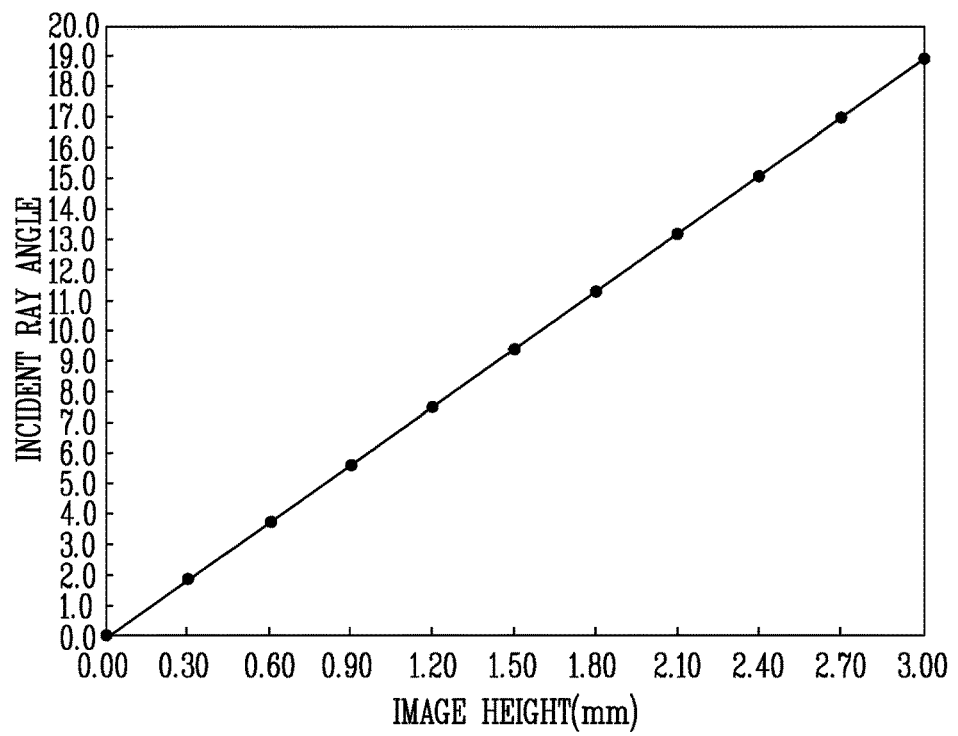
FIG. 1B is a graph for describing an incidence characteristic of light with an incidence angle (incident ray angle) that increases as getting farther away from a center zone of the filter portion.

FIG. 1B is a graph for describing an incidence characteristic of light with an incidence angle (incident ray angle) that increases as getting farther away from a center zone of the filter portion. An incidence angle at which light is incident onto the filter portion 140 through a lens increases as the light is getting farther away from the center zone (Image height=0). Also, although not illustrated, an incidence angle of light incident onto a peripheral zone surrounding the center zone increases more as the filter portion 140 and the imaging lens 130 are closer. The filter portion 140 according to the present invention includes filter zones having different transmission characteristics according to incident light with different incidence angles. Hereinafter, filter portions configured according to various embodiments will be described.

Figure 2A:
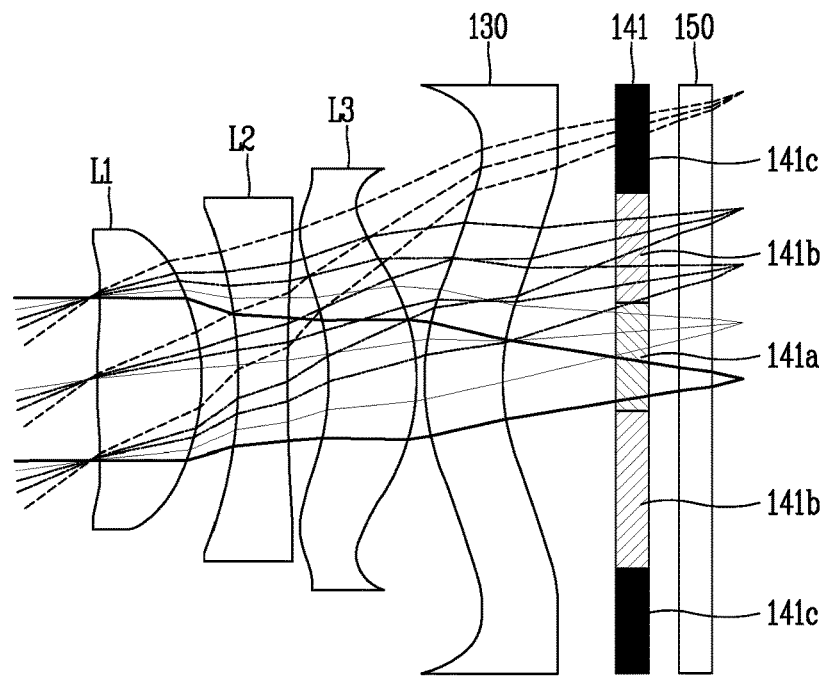
FIGS. 2A and 2B are conceptual views illustrating an integrally-formed filter member.
Figure 2B:
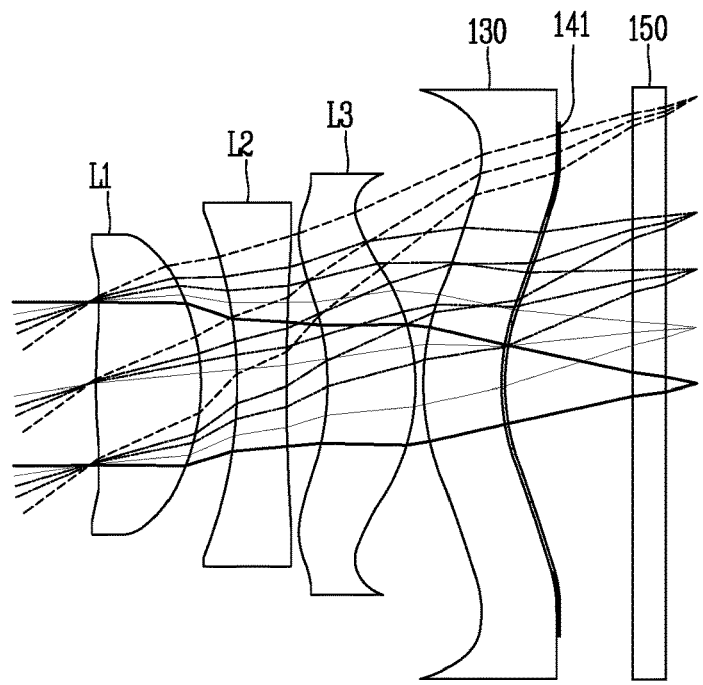

FIGS. 2A and 2B are conceptual views illustrating an integrally-formed filter member.

As illustrated in FIGS. 1 and 2A which are conceptual views illustrating a filter portion configured as a film type, a lens portion includes a plurality of lens groups L1, L2 and L3, and the imaging lens 130. Light transmitted through each lens group and the imaging lens 130 reaches the filter portion 140.

That is, the filter portion 140 is disposed between the imaging lens 130 and the image sensor 150. The filter portion 140 may be configured as a film member which can be fixed to the holder 110.

The film member 141 according to this embodiment may include a plurality of transmission zones (or areas) with different light transmission characteristics. For example, the film member 141 may be configured in a manner of coating different materials on sectioned zones (or areas) of a base member or in a manner of being coated on the sectioned zones of the base member by different methods. Among light successfully transmitted through the plurality of different transmission zones, light with a preset wavelength is cut.

For example, the film member 141 includes a center zone 141a and first and second peripheral zones 141b and 141c. The center zone 141a corresponds to an area facing a center portion of the imaging lens 130. For example, light may be incident onto the center zone 141a of the filter portion 141 at an incidence angle of 0°. An IR camera module prevents a transmission of light with the other wavelengths except for infrared rays, among light incident onto the center zone 141a of the filter portion 141. On the other hand, a visible ray camera module prevents a transmission of infrared light, among light incident onto the center zone 141a of the filter portion 141.

Meanwhile, the light is incident onto the first and second peripheral zones 141b and 141c at an incidence angle corresponding to each zone. An incidence angle of incident light onto the second peripheral zone 141c, which is located farther away from the center zone 141a, is greater than an incidence angle of incident light onto the peripheral zone 141b. Accordingly, a different transmission characteristic is observed according to each incidence angle. However, wavelength bands of light whose transmission is blocked by the first and second peripheral zones 141b and 141c are substantially similar or the same.

The drawings illustrate the two peripheral zones, but more peripheral zones may be formed according to a transfer distance of light based on a size of the camera module and an incidence angle of light based on the transfer distance.

The first peripheral zone 141b of the filter portion 140 may be formed to surround the center zone 141a. When the center zone 141a is formed in a circular shape, the first and second peripheral zones 141b and 141c may be formed in a shape like a donut having a preset width based on the circular shape. The filter portion 140 according to this embodiment may be configured such that all of the zones are integrally formed together.

Figure 4A:
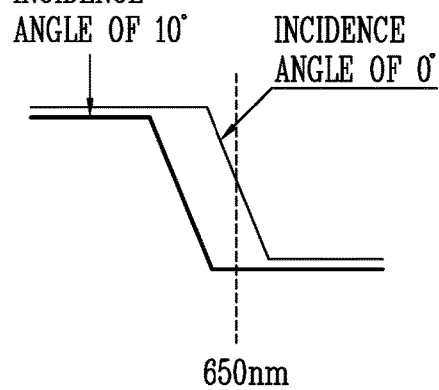
FIGS. 4A and 4B are conceptual views illustrating a transmission characteristic according to a filter portion including sectioned filter zones.
Figure 4A:
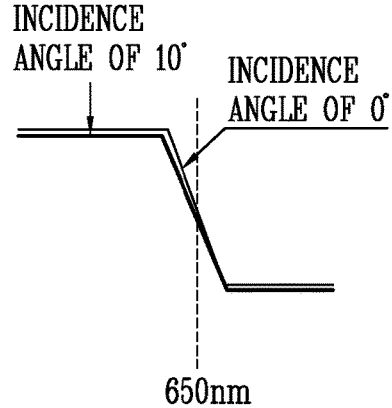
Figure 4B:
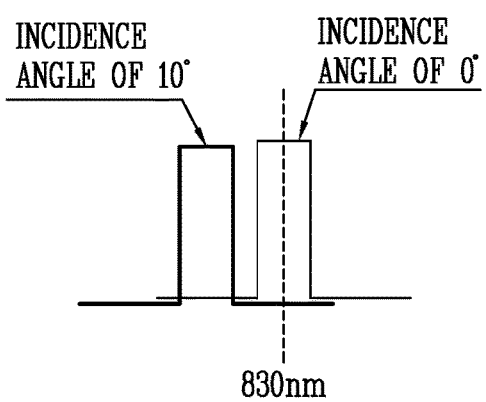
Figure 4B:
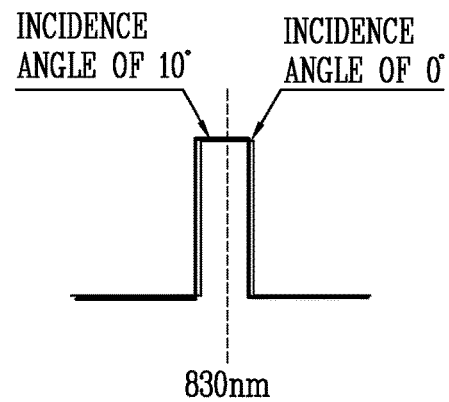

Here, the filter portion 140 may correspond to an IR band pass filter or an IR cut filter. FIGS. 4A and 4B are conceptual views illustrating a transmission characteristic according to a filter portion including sectioned filter zones.

An embodiment in which the filter portion 141 corresponds to an IR cut filter will be described with reference to FIG. 4A. The filter portion 141 is configured to cut light with wavelengths more than about 650 nm and transmit light with wavelengths smaller than 650 nm on the basis of the wavelength of about 650 nm. When light reaches the center zone 141a of the filter portion 141, the filter portion 141 cuts light with wavelengths over about 650 nm. Meanwhile, referring to (a) of FIG. 4A, in case where filter members having substantially the same characteristic are formed on the center zone 141a and the peripheral zone 141b, when light incident at about 10° reaches, some of light with wavelengths less than 650 nm are cut. Therefore, the wavelengths of light transmitted through the center zone and the peripheral zone have different characteristics.

However, as illustrated in (b) of FIG. 4A, when filter members with different transmission characteristics are formed on the center zone 141a and the peripheral zones 141b and 141c, light with wavelengths more than about 650 nm based on the wavelength of about 650 nm may be cut among light reaching each zone.

Hereinafter, an embodiment in which the filter portion 141 corresponds an IR band pass filter will be described with reference to FIG. 4B. The filter portion 141 is configured to transmit light with wavelengths within a preset range and cut light with wavelengths out of the preset range. Meanwhile, referring to (a) of FIG. 4B, in case where filter members with substantially the same characteristic are formed on the center zone 141a and the peripheral zone 141b, when light incident at about 10° reaches the first peripheral zone 141b of the filter portion 141, the filter member cuts light with wavelength of about 830 nm and transmits only light with wavelengths shorter than about 830 nm. Therefore, wavelengths of light transmitted through the center zone and the peripheral zone have different characteristics.

However, as illustrated in (b) of FIG. 4A, when filter members with different transmission characteristics are formed on the center zone 141a and the peripheral zones 141b and 141c, the filter members may transmit only light with wavelengths within a range including wavelengths of about 830 nm, among light reaching each zone.

The foregoing description has been given of the light incident onto the filter portion 141 at about 10°, but the characteristic according to the sectioned zone of the filter portion may not be limited to light with the incidence angle of 10°. Also, this will be applied sequentially the same to filter portions according to other embodiments described later.

Hereinafter, a filter portion formed on one surface of an imaging lens will be described with reference to FIG. 2B. The imaging lens 141 according to this embodiment may be defined by the center zone 141a, and a plurality of sectioned zones corresponding to the first and second peripheral zones 141b and 141c. Here, the corresponding sectioned zones may not be areas facing each other, but be sectioned according to areas onto which light is incident at a preset incidence angle.

A filter member includes the center zone 141a and the first and second peripheral zones 141b and 141c formed on each of the sectioned zones. The filter portion 141 may be integrally formed with the imaging lens 130. That is, each zone forming the filter portion 141 is formed of a filter member which is coated on one area of the imaging lens 130.

The filter portion 141 formed on the imaging lens 130 may be curved due to a surface of the imaging lens 130.

Although not illustrated, the present invention may not be limited to the structure that the filter portion 141 is formed on the imaging lens 130. For example, the filter portion 141 may alternatively be formed on one of the lens groups.

Also, the lens portion may include at least one mirror for switching a direction of light. In this instance, the filter portion 141 may be formed on the mirror. When the camera module 100 further includes a cover glass constructing an outer surface thereof, the filter portion 141 may be provided on one surface of the cover glass.

According to the present invention, the filter portion can be configured as filter members having different transmission characteristics according to incidence angles such that light with a preset wavelength can be transmitted. This may result in minimizing optical noise introduced into an image sensor, thereby improving image quality.

Also, since an incidence angle of light introduced into the image sensor can increase, the degree of freedom of designing a lens can increase, thereby reducing an entire size of a camera.

The foregoing description has been given of the filter portion 141 which is formed on sectioned zones of one component, but the present invention may not be limited to this. That is, each zone of the filter portion may be formed on a different component. Hereinafter, a filter portion as an IR band pass filter, which is formed on each area, will be described.

Figure 3A:
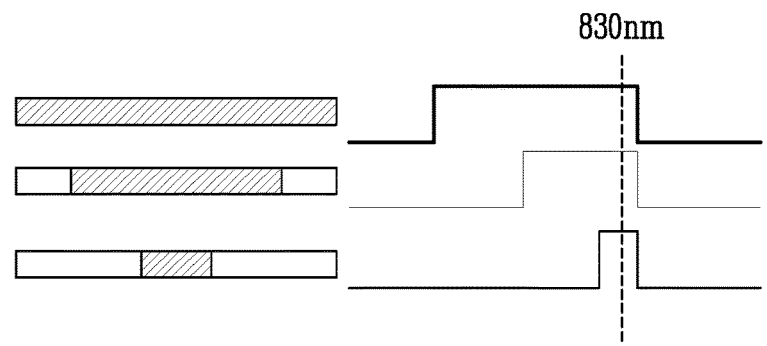
FIG. 3A is a conceptual view illustrating individual coating characteristics of filter members formed on different components, respectively.
Figure 3B:
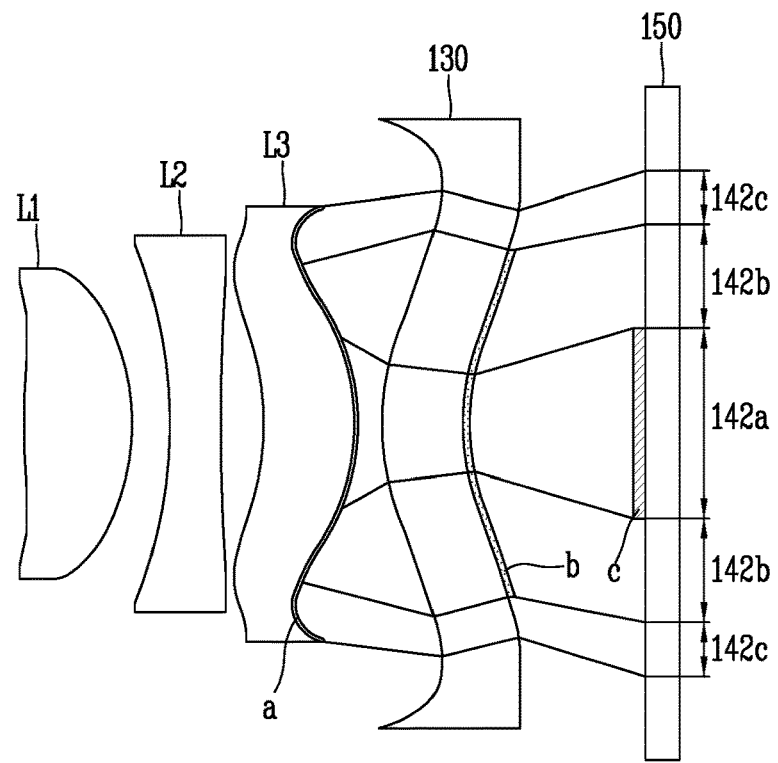
FIG. 3B is a conceptual view illustrating a filter portion in accordance with one embodiment.

FIG. 3A is a conceptual view illustrating individual coating characteristics of filter members formed on different components, respectively, and FIG. 3B is a conceptual view illustrating a filter portion in accordance with one embodiment.

A filter portion 142 may include a center zone 142a and first and second peripheral zones 142b and 142c. Also, the filter portion 142 includes first to third filter members a, b and c. The first to third filter members a, b and c are formed in a manner of being coated on at least two different members.

Although not illustrated, the first to third filter members a, b and c may be formed on different surfaces of the same component or coated on substantially the same surface in an overlapping manner.

For example, the first filter member a is formed fully on one surface of the third lens group L3. Referring to FIG. 3A, when light with an incidence angle of 0° reaches the first filter member a, the first filter member a transmits only light with wavelengths shorter than the wavelength of about 830 nm by a preset first range and cuts the rest of light. (As illustrated, light with wavelengths longer than the wavelength of about 830 nm by a preset range is included in a transmission range.)

Also, the second filter member b is formed on one surface of the imaging lens 130. The second filter member b is formed on an area through which light reaching the center zone 142a and the first peripheral zone 142b is transmitted. That is, the second filter member b corresponds to one area of the first filter member b.

When light with the incidence angle of 0° reaches the second filter member b, the second filter member b transmits only light with wavelengths shorter than the wavelength of about 830 nm by a preset second range and cuts the rest of light. (As illustrated, light with wavelengths longer than the wavelength of about 830 nm by a preset range is included in a transmission range.) The second range corresponds to a wavelength range narrower than the first range.

When light with an incidence angle associated with the second peripheral zone 142b reaches an area of the first filter member a that does not correspond to the second filter member b, the first filter member a cuts light except for infrared rays. Here, the associated incidence angle refers to an incidence angle of light which reaches based on the image filter 150.

Also, while light having the incidence angle associated with the first peripheral zone 142b passes through the first and second filter members a and b, the rest of light except for the infrared rays is cut. That is, the first and second filter members a and b may function as an IR band pass filter when they overlap each other.

Meanwhile, the third filter member c is formed on one area corresponding to the center zone 142a on one surface of the image sensor 150. The third filter member c transmits only the infrared rays when light with the incidence angle of 0° reaches.

However, the configuration that each filter member is formed may not be limited to this. Alternatively, an IR cut filter may also be formed on each component in substantially the same manner, and the number of filter members forming the filter portion 142 may not be limited to three.

The filter portion according to this embodiment can be fabricated by a simplified method and thus a mass production thereof can be improved.

The aforementioned terminal and the terminal with the cover will not be limited to the configurations and methods according to the foregoing embodiments, but all or part of the embodiments will be selectively combined so as to be modified into various forms.

INDUSTRIAL AVAILABILITY

The present invention may be applicable to electronic devices in various fields including a camera receiving light with different incidence angles, and related industrial fields.

The invention claimed is:

1. A camera module, comprising:
a lens group including a plurality of lenses;
an imaging lens on which incident light from an external environment is reflected;
an image sensor for obtaining image data related to the external environment by means of the light; and
a filter portion for cutting light having a preset wavelength, and sectioned into a center zone on which light is incident at a first incidence angle, and a peripheral zone which surrounds the center zone and on which light is incident at a second incidence angle that is greater than the first incidence angle,
wherein the filter portion having the center zone and the peripheral zone is configured to cut light having different wavelengths, among the incident light having the first and second incidence angles,
wherein the filter portion includes a plurality of filter members,
wherein the plurality of filter members are coated on different surfaces among the plurality of lenses, the imaging lens and the image sensor, and
wherein the plurality of filter members are arranged in an overlapping manner on one area thereof, so as to cut light with the preset wavelength, among the incident light having the first and second incidence angles.

2. The camera module of claim 1, wherein the filter portion is formed of a coating material cutting light with wavelengths except for infrared light, among the incident light.

3. The camera module of claim 1, wherein the filter portion is formed of a coating material preventing a transmission of infrared light among the incident light.

4. The camera module of claim 1, wherein at least one of the plurality of filter members is formed on at least one surface of the imaging lens.

5. The camera module of claim 1, wherein at least one of the plurality of filter members is formed on one surface of the image sensor.

6. The camera module of claim 1, further comprising a cover glass configuring a part of an outer surface of the camera module and made of a transparent material for allowing an introduction of light,
wherein at least one of the plurality of filter members is formed on one surface of the cover glass.

7. The camera module of claim 1, wherein the center zone comprises an area on which light transmitted through the imaging lens is incident at an angle of 0°.

* * * * *